United States Patent [19]

Bossert et al.

[11] Patent Number: 5,611,837
[45] Date of Patent: Mar. 18, 1997

[54] BIOREMEDIATION METHOD

[75] Inventors: Ingeborg D. Bossert, Newburgh; Michael V. Walter, Verbank; Edward C. Nelson, LaGrangeville, all of N.Y.

[73] Assignee: Texaco, Inc., White Plains, N.Y.

[21] Appl. No.: 327,745

[22] Filed: Oct. 24, 1994

[51] Int. Cl.⁶ .............................. C05G 3/06; C05G 3/04
[52] U.S. Cl. .................... 71/27; 71/28; 71/903; 71/904; 134/7; 435/262
[58] Field of Search ............... 134/7; 210/680; 71/903, 904, 27, 28, 1; 435/262

[56] References Cited

U.S. PATENT DOCUMENTS

| | | | |
|---|---|---|---|
| 4,005,043 | 1/1977 | Fuscy | 252/356 |
| 4,460,692 | 7/1984 | Tellier et al. | 435/243 |
| 4,462,910 | 7/1984 | Lepair et al. | 210/610 |
| 5,238,575 | 8/1993 | Waldmann | 210/680 |
| 5,300,227 | 4/1994 | Varadaraj et al. | 210/610 |

*Primary Examiner*—Ferris Lander
*Attorney, Agent, or Firm*—Henry H. Gibson; James L. Bailey; Harold J. Delhommer

[57] ABSTRACT

A surfactant-fertilizer compound for enhancing the biodegradation of hydrocarbons in soil or water comprising the reaction product of guanidine and at least one carboxylic acid is provided.

17 Claims, 2 Drawing Sheets

5,611,837

BIOREMEDIATION METHOD

BACKGROUND OF THE INVENTION

1. Field of the Invention

This invention relates to the enhanced biodegradation of hydrocarbons in soils and water. More particularly, this invention relates to a process for increasing the rate of biodegradation of hydrocarbons in soils and water by amending the soil or water with a surfactant-fertilizer compound.

2. Description of Related Information

Hydrocarbons such as crude petroleum and petroleum-derived products are complex mixtures of straight and branched-chain alkanes and alkenes, saturated ring compounds, and aromatic compounds. Small amounts of sulfur, nitrogen, or oxygen can also be covalently attached to these various hydrocarbon compounds. Gasoline, kerosene, burner fuel oil, diesel oil, gas turbine oil, and aviation fuel are examples of petroleum-derived fuel oils, distillates, or catalytically processed petroleum fractions widely used by industry. Unfortunately, a side effect of this widespread use is the contamination of the environment, resulting from spillage, seepage, or accidental release of petroleum derived hydrocarbons.

In the past, a generally accepted procedure for controlling possible environmental damage of hydrocarbon-contaminated soil involved permanent removal of the contaminated soil to a secure landfill. However, the decreasing availability of landfills which can accept hazardous wastes, the high cost of excavation and transportation of soil from hydrocarbon-contaminated sites, and the potential liability exposure associated with off-site transport and disposal, have made landfill disposal of hydrocarbon-contaminated soil an increasingly unattractive means for handling hydrocarbon-contaminated soils.

An alternative procedure for cleaning hydrocarbon-contaminated soils is known as bioremediation. Bioremediation is a natural process which provides for the degradation of hydrocarbonaceous contaminants by biologic materials, such as bacteria, saprophytes, fungi, protozoa, bacterial enzymes, or saprophytic enzymes, to carbon dioxide, water and more cell biomass. These hydrocarbon degrading microorganisms are often naturally present, i.e., indigenous, in contaminated soils, and, given sufficient time, they can naturally degrade the hydrocarbon contaminants. The bioremediation of hydrocarbon-contaminated soils is favored over soil removal or chemical treatment of soil, for several reasons, including lower cost and the ability for on-site reduction of hydrocarbon contamination.

The advantages of bioremediation can be outweighed, however, by the substantial length of time required to bioremediate by means of indigenous microorganisms: even under optimum conditions, months or years may be required to reduce the levels of hydrocarbon contamination of soils to a desired level. This disadvantage has greatly limited the use of bioremediation to reduce hydrocarboncontaminated environments.

It would be useful to decrease the time required for the bioremediation of a contaminated site. It is already well-known that certain environmental conditions are important factors in microbial growth and activity, and therefore affect the rates at which biodegradation occurs. Two parameters which directly effect biodegradation are: a) the availability of nitrogen to the microbiota; and b) the availability of the contaminating substrate to the microbiota. These parameters are often difficult to change and/or deliver in an in-situ soil environment. For example, it is known to add nitrogen, in the form of a fertilizer, to the soil to enhance the growth of the microbiota, but it is often difficult to achieve a good physical distribution of the nitrogen. One method for enhancing the distribution of the added fertilizer is to use an aqueous solution containing fertilizer and a surfactant. The surfactant makes it easier for the fertilizer to distribute through the contaminated soil, and has the added benefit of enhancing the contact of the microbiota with the contaminant. A problem with this method is that when the fertilizer and the surfactant are applied, however, they tend to differentially partition and distribute unevenly in the contaminated soil. This reduces the availability of the fertilizer to the indigenous microbiota.

It would be desirable, therefore, to provide fertilizer and a surfactant to contaminated soil in a manner such that the fertilizer and surfactant do not differentially partition and distribute unevenly. The present invention directly addresses the shortcomings of natural bioremediation and bioremediation enhanced by the simple addition of a mixture of fertilizer and surfactant by providing a surfactant-fertilizer molecule which, when introduced into a contaminated matrix, does not differentially partition, provides greater distribution of the fertilizer, provides greater contact between the microbiota and the contaminant and increases the rate of hydrocarbon contaminant degradation.

SUMMARY OF THE INVENTION

A surfactant-fertilizer compound is provided which enhances the biodegradation of hydrocarbons in soil or water. The surfactant-fertilizer comprises the reaction product of guanidine or a substituted guanidine and at least one carboxylic acid. In another embodiment, a process is provided for enhancing the biodegradation of hydrocarbons in soil or water comprising the step of adding the reaction product of guanidine or a substituted guanidine and an alkyl carboxylic acid to the soil or water.

DETAILED DESCRIPTION OF THE INVENTION

Figure 1:
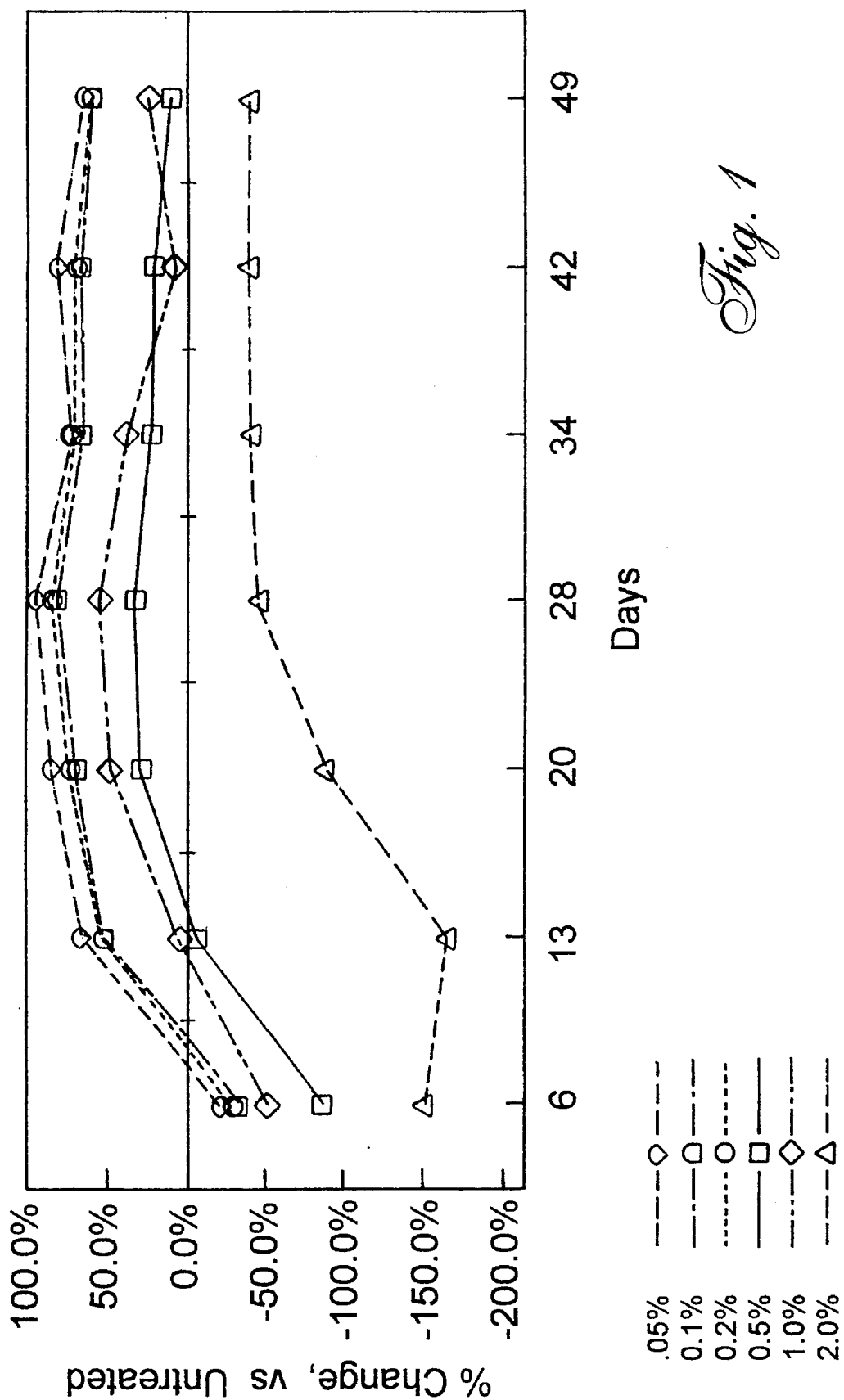
FIG. 1 is a graph which depicts the relative changes in hydrocarbon mineralization as a function of surfactant-fertilizer concentration.

The present invention provides a surfactant-fertilizer compound useful for enhancing the biodegradation of hydrocarbons in soil or water. The surfactant-fertilizer comprises the reaction product of guanidine or a substituted guanidine and at least one carboxylic acid. Applicants have found that when this surfactant-fertilizer compound is added to hydrocarbon-contaminated soil or water, it significantly enhances the rate of biodegradation of the hydrocarbon contaminant that would otherwise naturally take place in the absence of the surfactant-fertilizer of the present invention.

The surfactant-fertilizer of the present invention has the general formula:

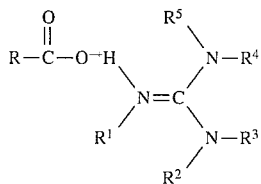

where R is a branched or straight-chain, saturated or unsaturated, alkyl or alkaryl substituent containing about 6 to about 30 carbon atoms, and $R^1$–$R^5$ are independently hydrogen, or alkyl, alkaryl, or aryl substituents, each containing from about 1 to about 25 carbon atoms. In a preferred embodiment, R is a normal alkane containing about 7 to about 15 carbon atoms, and $R^1$–$R^5$ are hydrogen.

The surfactant-fertilizers having the above formula can be synthesized by reacting a carboxylic acid or mixture of carboxylic acids with guanidine, or a substituted guanidine represented by the formula:

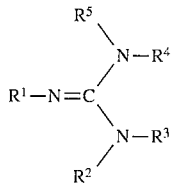

where $R^1$–$R^5$, are independently hydrogen, or alkyl, alkaryl, or aryl substituents, each containing from about 1 to about 25 carbon atoms. Alternatively, the guanidine reactant can be in the form of a salt of guanidine or of a substituted guanidine. The guanidine reactant can comprise a mixture of guanidine, substituted guanidines and/or salts thereof. Hereinafter, when we use the term "guanidine" we mean one or more of guanidine, substituted guanidines or salts of either guanidine or a substituted guanidine.

Applicants use the term "reacting" to indicate that the materials can be mixed together as solids, as solutions or dispersions of a solid in a liquid, as miscible or immiscible liquids, or as solutions in appropriate solvents. Reacting can include heating and mixing by methods commonly known in the art to accelerate rates of reaction. Carboxylic acids include aliphatic, cycloaliphatic or arylaliphatic organic compounds containing one or more carboxylic acid functional groups. Salts of guanidine or substituted guanidines, such as carbonates, chlorides, etc., may be used as convenient sources of guanidine. The guanidine and carboxylic acid are reacted in carboxylic acid:guanidine equivalent ratios of between 1:10 and 10:1, and preferably in about a 1:1 equivalent ratio.

The carboxylic acids can be any fatty acids which, when reacted with the guanidine, will serve as surfactants to increase solubilization, wetting and/or desorption of organic contaminants in soils, thereby increasing their availability to degrading microorganisms which live in the aqueous film surrounding a soil particle. For example, $C_6$ to $C_{30}$ aliphatic, cycloaliphatic or arylaliphatic carboxylic acids are useful. Alternatively, if the guanidine moiety contains an alkyl group which will serve as an additional surfactant, then the range of carboxylic acid substituents can extend down to $C_1$. Inexpensive fatty acids can be obtained from many plant and animal sources; examples include coconut, palm, tallow, soya and tall oils. An advantage using these fatty acid moieties is that over time they will degrade and provide an additional carbon substrate for the degrading soil microbiota, increasing biomass.

The guanidine moiety acts as a fertilizer, providing nitrogen in an organic and readily-utilizable form which is slowly released upon hydrolysis of the amide and imide bonds. Like the fatty acids, it is also biodegradable and will serve as an ancillary source of carbon for stimulating the growth and activity of degrading microbial populations. Most importantly, its high nitrogen content, approximately 10–20 wt. % (70 wt % of guanidine), provides excess nitrogen to adjust carbon:nitrogen ratios in the contaminated soil to lower, more favorable ones, for faster rates of biodegradation. Optimal carbon:nitrogen ratios range from 9:1 to 200:1.

While the Applicants do not wish to be bound by any particular theory, they believe that the combined surfactant-fertilizer compound of the present invention increases the rate of biodegradation by two mechanisms. First, the surfactant-fertilizer increases mass transfer between the microorganisms and the hydrocarbon contaminant in the soil or water. Second, the surfactant-fertilizer compound provides a source of nitrogen and readily-assimilable carbon to the microorganisms, thereby increasing their propagation.

The surfactant-fertilizer is applied to contaminated soil or water, where it will enhance the bioremediation caused by the indigenous microorganisms. When the surfactant-fertilizer compound is water soluble, it can be applied to the contaminated soil or water in an aqueous solution. When the surfactant-fertilizer is water-insoluble, it may be dispersed in water, or added as a finely divided solid, alone or in combination with other solid materials. Where possible, it is preferable to mechanically mix the contaminated soil or water after inoculation to increase distribution of the surfactant-fertilizer. In addition to its usefulness with indigenous microorganisms, the surfactant-fertilizer compound can be applied to the soil in conjunction with a slurry of non-indigenous biodegrading microorganisms.

A typical aqueous solution of the surfactant-fertilizer compound of the present invention will contain between about 0.001 and about 10 wt % of the surfactant-fertilizer, based on total solution weight. Preferably the solution will contain between about 0.1 and about 2 wt. %.

The surfactant-fertilizer compound is typically added to hydrocarbon-contaminated soil or water in a concentration of between about 1 part by weight of the surfactant-fertilizer solution per 1 to about 10,000 parts by weight of contaminant, preferably in a concentration of about 1 part in 5 to about 1 part in 2000 and typically in a ratio of about 1 part in 10 to about 1 part in 1000.

The concentration of contaminant can be determined by any suitable method. One preferred method is to mix 30 grams of soil with 15 grams of a solid drying agent, such as anhydrous sodium sulfate, and then continuously extract the mixture with methylene chloride in a Soxhlet Extractor for between 6 to 24 hours. The solvent is then removed under a vacuum of approximately 10 mm Hg at 35° C. to afford a hydrocarbon residue which can be weighed.

Due to the unique mineralogical and geochemical make-up of different soils, as well as the type and level of contaminating compounds, the optimum dose of the surfactant-fertilizer can be expected to vary. To account for this variability, the optimum dose of the surfactant to use can be determined by conducting a dose-response experiment as described in Example III, using biometers to measure the production of $CO_2$, or as described in Example V, measuring change in total extractable hydrocarbon concentration. Such experiments could be conducted as part of the standard treatability study which is routinely conducted prior to initiation of full scale bioremediation efforts,

EXAMPLE I

Synthesis of surfactant-fertilizer

Guanidine carbonate (7.2 g) and Proctor & Gamble C-110 (16.6 g) were combined and heated in a glass reaction vessel at 50° C. for 24 hours. Proctor & Gamble C-110 is a mixture of fatty acids derived by hydrolysis of coconut oil. Ethanol (95%, 20 ml) was then added, and heating was continued for an additional 24 hours. The ethanol was removed in vacuo to afford 21.4 g of a yellow semi-solid. Dissolution in deionized water was facile, producing a clear, foaming solution. Chemical analysis of a crude reaction mixture indicated the product consisted substantially of the guanidinium salt of coconut acids. Percent nitrogen analysis indicated 15.3% of the mixture was nitrogen. Infrared analysis of a thin film of the reaction mixture revealed major absorbances at 3378, 2914, 1659 and 1523 $cm^{-1}$, indicative of an aliphatic guanidinium salt. $^{13}C$—NMR in DMSO showed resonances at 184 and 164 ppm, indicative of carbonyl/imine carbon resonances, and resonances at 44, 37, 28 and 18 ppm, consistent with carbon resonances in a aliphatic chain.

Table I provides results for a series of prepared compositions of matter. Commercially available acids were treated with guanidine carbonate and isolated as solids or liquids after evaporation of any solvent. Elemental analysis of the product indicates total nitrogen content in the products.

TABLE I

Analysis of Synthesized Carboxylic Acid - Guanidinium Salts.

| Carboxylic Acid (g) | Guanidine Carbonate (g) | Product Recovered (g) | % N |
|---|---|---|---|
| Hexanoic, 2.3 | 1.8 | 3.7 | 22.3 |
| Octanoic, 2.9 | 1.8 | 4.2 | na |
| Decanoic, 3.4 | 1.8 | 4.7 | na |
| Oleic, 5.6 | 1.8 | 6.9 | na |
| Lauric, 4.0 | 1.8 | 5.0 | na |
| Palmitic, 5.1 | 1.8 | 6.8 | 12.7 |
| P&G T-22, 20.0 | 6.6 | 25.3 | 12.0 |
| P&G C-110, 16.6 | 7.2 | 21.4 | 15.3 |
| P&G S-210, 15.9 | 5.1 | 19.7 | 11.7 |

Material produced in this manner possesses surface active properties, typical of similar surfactants that enhance the solubility of hydrocarbons in water. These properties can be measured using a ring tensiometer. In the case of the coconut acid-guanidinium (surfactant-fertilizer) product, changes in surface tension with concentration, presented in Table II, demonstrate this property.

TABLE II

Effect of Concentration on Surface Tension of Coconut acid/Guanidine Surfactant-fertilizer

| Active Surfactant Concentration (g/L) | Surface Tension (dyne/cm), $H_2O$ 22° C. |
|---|---|
| 1.38 | 25.6 |
| 0.693 | 26.5 |
| 0.346 | 28.4 |
| 0.173 | 33.4 |
| 0.0866 | 39.0 |
| 0.0217 | 55.0 |
| 0.00542 | 69.5 |

EXAMPLE II

Activity of surfactant-fertilizer in contaminated soil

A 0.5 wt % aqueous surfactant-fertilizer solution was tested. 3.0 ml of the surfactant-fertilizer solution was applied to 30 g of a contaminated sandy soil, collected from the subsurface of an area with historic petroleum contamination, containing approximately 1 wt. % contaminant. Thus, the surfactant-fertilizer was added at a surfactant-fertilizer:contaminant ratio of about 1:5 parts by weight. Incubations were in biometer flasks, at ambient temperatures, for a total of 49 days. The thoroughly mixed soil is added into the biometer flask (Bartha, R., and D. Pramer. 1965. Soil Science 100:68–70). The amount of $CO_2$ given off by bacteria as they consumed hydrocarbons in the soil contained in biometers is quantified by trapping it in an alkali solution of 0.2N KOH. The $CO_2$ absorbed by the alkali solution neutralizes the base stoichiometrically over time. By titrating the residual base with a standard acid solution of 0.1N HCl, amount of $CO_2$ that was produced during bioremediation in the soil can be calculated. Carbon dioxide production served as a measure of hydrocarbon mineralization, and was monitored throughout the period. The cumulative results are presented in Table III, below.

TABLE III

Effect of Surfactant-fertilizer on Hydrocarbon Mineralization in a Petroleum-Contaminated Soil[1]

| Days Incubated | A non-contaminated soil treated with surfactant-fertilizer | B contaminated soil - untreated | C contaminated soil treated with surfactant fertilizer | D % Change |
|---|---|---|---|---|
| 13 | 433 | 463 | 525 | 13.4 |
| 20 (21)* | 510 | 599* | 730 | 21.9 |
| 29 | 668 | 719 | 812 | 12.9 |
| 36 | 713 | 769 | 872 | 13.4 |
| 49 | 775 | 829 | 930 | 12.2 |

[1]All data in micromoles $CO_2$.

In Table III, Column A provides the amount of $CO_2$ which evolved due to the biodegradation of the surfactant-fertilizer itself. These values were used to account for the $CO_2$ evolved due to biodegradation of the surfactant-fertilizer, so that a direct comparison could be made between the results for contaminated soil containing surfactant-fertilizer and the results for contaminated soil without surfactant-fertilizer.

Column B provides the amount of $CO_2$ which is evolved due to the biodegradation of the contaminant, without the enhancement provided by the surfactant-fertilizer. Column C represents the $CO_2$ which evolved due to the biodegradation of contaminant in the presence of the surfactant-fertilizer, subtracting the $CO_2$ evolved from degradation of the surfactant-fertilizer itself. Column B can therefore be compared directly to Column C to determine the additional $CO_2$ which is evolved due to the biodegradation enhancement provided by the surfactant-fertilizer. Column D represents the % change, in additional $CO_2$ evolved, due to the enhancement of biodegradation provided by the surfactant-fertilizer.

As indicated above, the data in Table III show the per cent change in cumulative activity of the treated soil versus the untreated soil. For the treated soil, the data demonstrate between a 12–21% increase in carbon dioxide derived from mineralization of hydrocarbon residues. It should also be noted that carbon dioxide which is attributable to degradation of surfactant-fertilizer is high, indicating that the compound is biodegradable, and will not itself contaminate the environment.

EXAMPLE III

Dose Response Investigation

In Example III, a more detailed investigation of concentration-dependent effects on biodegradation was conducted. In the same experimental soil and using the same biometers as Example II, a dose-response relationship was observed for the coconut acid-guanidinium compound. FIG. 1 depicts the relative changes in HC mineralization as a function of surfactant-fertilizer (CGS) concentration. The data are normalized and plotted in relation to the untreated control (0%). A dose-response is evident for the surfactant-fertilizer. Surfactant-fertilizer concentration $\leq 0.2$ wt % increased rates of hydrocarbon mineralization approximately 90% over that of the untreated soil, whereas 0.5 and 1.0% concentration increased rates by almost 50%; at the highest concentration tested, 2.0 wt % actually inhibited hydrocarbon mineralization in this particular contaminated soil.

These data suggest that there is an optimum dosage of the surfactant/nutrient for this particular combination of contaminant, soil type and reaction conditions. Factors such as adsorption of the surfactant/fertilizer to a specific soil or contaminant, level of contamination, and reaction conditions will effect the optimum dosage. Example IV, below, shows that high activity of the surfactant/fertilizer is observed in soil slurries at dosages where inhibition of mineralization was observed under the biometer conditions described in Example III.

EXAMPLE IV

The surfactant/fertilizer was also found to enhance the rate of carbon dioxide evolution in soil slurry systems. In these experiments 30 grams of soil, contaminated with 0.95 wt % of extractable hydrocarbon, was mixed with 300 ml of deionized water in a flask. The surfactant/fertilizer was added so as to achieve a weight ratio of about 1 part in 5(treatment A) or about 1 part in 10 of surfactant/fertilizer to contaminant(treatment B). A sealed 1 liter Erlenmeyer flask, containing a KOH-solution trap for adsorbing evolved $CO_2$, was flushed with $CO_2$-free air, sealed and shaken at 130 rpm on a rotary shaker at 30° C. Periodically, the KOH solution in the $CO_2$ trap was removed, treated with barium chloride, and titrated with dilute hydrochloric acid solution. Fresh KOH solution was added to the trap, the flask was flushed with $CO_2$-free air, and rotary shaking was continued. Table IV shows the cumulative amount of $CO_2$ produced during the 8 day reaction period. We found that treatment A provided 620% of the amount of $CO_2$ evolved by the untreated controls, while treatment B provided 446% of the $CO_2$ evolved by the untreated controls.

Since the surfactant-fertilizer contains mineralizable carbon, some of the evolved $CO_2$ in the treated flasks is derived from biodegradation of the surfactant/fertilizer. Assuming that all of the available carbon in the surfactant/fertilizer has been converted completely to $CO_2$, none of it is converted to biomass and none remains at the end of the reaction period, we calculated the percent of hydrocarbon-only, that has been mineralized. For treatment B, 17.8 mg of carbon was added as surfactant/fertilizer. Complete oxidation of the added surfactant/fertilizer could afford as much as 1.48 mmol $CO_2$. If we attribute 1.48 mmol of the $CO_2$ produced in treatment B to mineralization of the surfactant/fertilizer, then the net amount of $CO_2$ produced was at least 1.13 mmol. In comparison to the average of duplicates of untreated controls (0.59 mmol $CO_2$), our treated flask B produced at least 91% more $CO_2$ than untreated controls. This strongly indicates that the surfactant-fertilizer enhances hydrocarbon contaminant mineralization.

TABLE IV

Effect of Surfactant-fertilizer on Hydrocarbon Mineralization of a Contaminated Soil Slurry

| Flask | Treatment | Wt. ratio - surfactant-fertilizer: contaminant | Evolved $CO_2$ | Percent of average of untreated controls |
|---|---|---|---|---|
| A | surfactant-fertilizer | 1:5 | 3.63 | 620 |
| B | surfactant-fertilizer | 1:10 | 2.61 | 446 |
| C | no treatment | none | 0.65 | — |
| D | no treatment | none | 0.52 | — |

EXAMPLE V

Figure 2:
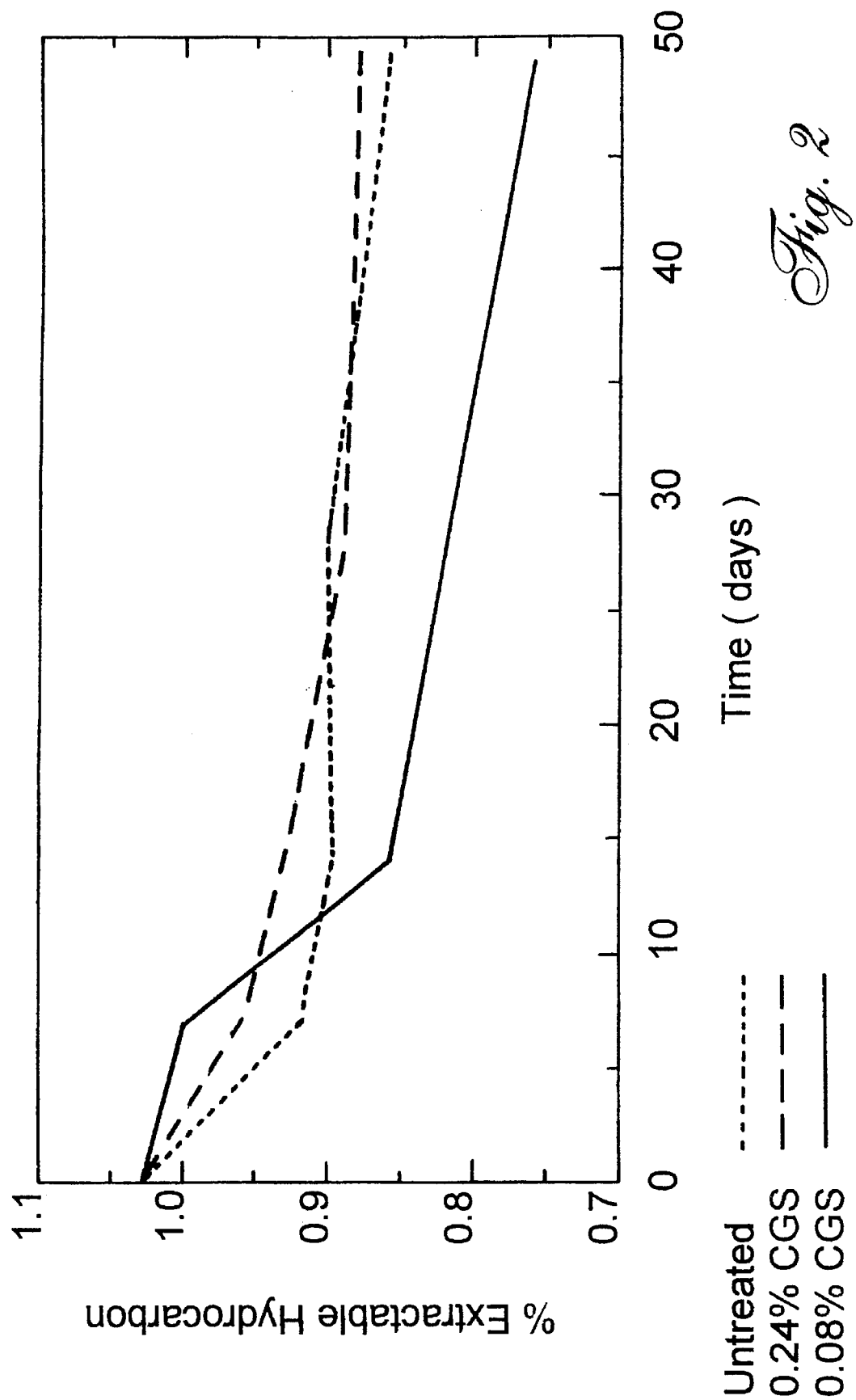
FIG. 2 is a graph which compares the degradation of hydrocarbons as a function of two surfactant-fertilizer concentrations.

In another dose response experiment, using a silty clay soil, hydrocarbon losses in contaminated soils were measured by determination of residual hydrocarbons in soils treated with varying amounts of the coconut acid/guanidine surfactant-fertilizer. For these studies, replicate beakers containing 200 g of soil contaminated with 1.028 wt % hydrocarbon were incubated with two different amounts of the surfactant-fertilizer, 173 or 519 mg/200 g soil, added in aqueous solution. In order to improve the texture of this particular clayey soil, 10 g of washed sand was added to each soil incubation, prior to watering. At selected time intervals during incubation, replicates were sacrificed, and their hydrocarbon content was determined gravimetrically by exhaustive extraction with methylene chloride. FIG. 2 shows the amount of extractable hydrocarbons (soil wt %) remaining in the soils up to 49 days of incubation. The results show that more hydrocarbon was removed in soils receiving the lower amount of the surfactant-fertilizer (0.08%), whereas the surfactant-fertilizer (CGS) added at a higher concentration exhibited no increase over the untreated controls.

Results described here clearly demonstrate that the guanidinium salt surfactants of the present invention can significantly increase rates of hydrocarbon mineralization in contaminated soils. In addition, enhanced biodegradation would be expected in matrices other than soil, e.g. slurries, fresh water, saltwater, marshes, beaches, etc.

We claim:

1. A process for enhancing the biodegradation of hydrocarbons in a hydrocarbon-contaminated matrix comprising adding a surfactant-fertilizer to the hydrocarbon-contaminated matrix in a concentration of about 1 part by weight surfactant-fertilizer per each 1 to about 10,000 parts by weight of hydrocarbon contaminant, where the surfactant-fertilizer is the reaction product of guanidine, represented by the formula

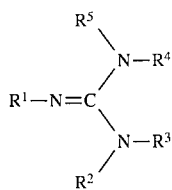

and at least one alkyl carboxylic acid of formula:

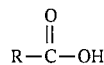

where R represents one or more branched or straight-chain, saturated or unsaturated, alkyl or alkaryl substituent containing between about 6 and about 30 carbon atoms from plant or animal sources, and $R^1$–$R^5$ are independently one or more of hydrogen, or alkyl, alkaryl, or aryl substituents, each containing between about 1 and about 25 carbon atoms.

2. The process of claim 1 where the surfactant-fertilizer is added to the hydrocarbon-contaminated matrix in a concentration of about 1 part by weight surfactant-fertilizer per each 5 to about 2000 parts by weight of hydrocarbon contaminant.

3. The process of claim 1 where the surfactant-fertilizer is added to the hydrocarbon-contaminated matrix in a concentration of about 1 part by weight surfactant-fertilizer per each 10 to about 1000 parts by weight of hydrocarbon contaminant.

4. The process of claim 1 where R represents one or more normal alkanes containing between about 7 and about 15 carbon atoms, and $R^1$–$R^5$ are hydrogen.

5. The process of claim 1 wherein the carboxylic acid comprises a mixture of fatty acids derived from plant or animal sources.

6. The process of claim 5 wherein the plant or animal source is coconut, tallow, soya, palm or tall oils.

7. The process of claim 1 where the guanidine and the alkyl carboxylic acid are reacted in equivalent ratios of between about 1:10 and about 10:1.

8. The process of claim 1 where the guanidine and the alkyl carboxylic acid are reacted in an equivalent ratio of about 1:1.

9. The process of claim 1 wherein the hydrocarbons comprise crude or refined hydrocarbons, petrochemicals, chlorinated hydrocarbons, phenols, coal-tar residues, organic sludges, refinery wastes, or producing wastes.

10. A surfactant-fertilizer compound for enhancing the biodegradation of hydrocarbons in soil or water comprising the reaction product of guanidine, represented by the formula

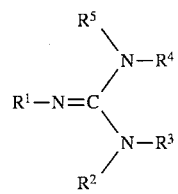

and at least one alkyl carboxylic acid of formula:

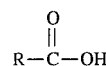

where R represents one or more branched or straight-chain, saturated or unsaturated, alkyl or alkyl substituent containing between about 6 and about 30 carbon atoms from plant or animal sources, and $R^1$–$R^5$ are independently one or more of hydrogen, or alkyl, alkaryl, or aryl substituents, each containing between about 1 and about 25 carbon atoms.

11. The surfactant-fertilizer of claim 10 where R represents one or more normal alkanes containing between about 7 and about 15 carbon atoms, and $R^1$–$R^5$ are hydrogen.

12. The surfactant-fertilizer of claim 10 wherein the carboxylic acid comprises a mixture of fatty acids derived from plant or animal sources.

13. The surfactant-fertilizer of claim 12 wherein the plant or animal source is coconut, tallow, soya, palm or tall oils.

14. The surfactant-fertilizer of claim 10 where the guanidine and the alkyl carboxylic acid are reacted in a equivalent ratios of between about 1:10 and about 10:1.

15. The surfactant-fertilizer of claim 10 where the guanidine and the alkyl carboxylic acid are reacted in an equivalent ratio of about 1:1.

16. The surfactant-fertilizer of claim 10 wherein the hydrocarbons comprise crude or refined hydrocarbons, petrochemicals, chlorinated hydrocarbons, phenols, coal-tar residues, organic sludges, refinery wastes, or producing wastes.

17. A process for enhancing the biodegradation of hydrocarbons in soil or water comprising adding to the contaminated soil or water one or more compounds of formula

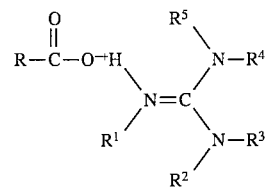

where R represents one or more branched or straight-chain, saturated or unsaturated, alkyl or alkaryl substituent containing about 6 to about 30 carbon atoms; and $R^1$–$R^5$ independently represent one or more of hydrogen, or alkyl, alkaryl, or aryl substituents, each containing from about 1 to about 25 carbon atoms.

* * * * *